US011632712B2

(12) United States Patent
Shrestha et al.

(10) Patent No.: US 11,632,712 B2
(45) Date of Patent: Apr. 18, 2023

(54) SYSTEM INFORMATION PARAMETER UPDATE TIME IN NON-TERRESTRIAL NETWORK

(71) Applicant: QUALCOMM Incorporated, San Diego, CA (US)

(72) Inventors: Bharat Shrestha, San Diego, CA (US); Umesh Phuyal, San Diego, CA (US); Xiao Feng Wang, San Diego, CA (US); Ayan Sengupta, San Diego, CA (US); Liangping Ma, San Diego, CA (US); Alberto Rico Alvarino, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 18 days.

(21) Appl. No.: 17/243,151

(22) Filed: Apr. 28, 2021

(65) Prior Publication Data

US 2022/0353794 A1 Nov. 3, 2022

(51) Int. Cl.
*H04W 48/16* (2009.01)
*H04W 76/28* (2018.01)
*H04W 68/00* (2009.01)
*H04W 72/12* (2009.01)

(52) U.S. Cl.
CPC ......... *H04W 48/16* (2013.01); *H04W 68/005* (2013.01); *H04W 72/12* (2013.01); *H04W 76/28* (2018.02)

(58) Field of Classification Search
CPC ... H04W 48/16; H04W 68/005; H04W 72/12; H04W 76/28
See application file for complete search history.

(56) References Cited

U.S. PATENT DOCUMENTS

2008/0069118 A1* 3/2008 Monier ................. H04W 40/22
370/400

FOREIGN PATENT DOCUMENTS

WO 2020034333 A1 2/2020

OTHER PUBLICATIONS

International Search Report and Written Opinion—PCT/US2022/071093—ISA/EPO—dated Jun. 17, 2022.

(Continued)

*Primary Examiner* — Diane D Mizrahi
(74) *Attorney, Agent, or Firm* — Harrity & Harrity, LLP; Dang M. Vo

(57) ABSTRACT

Various aspects of the present disclosure generally relate to wireless communication. In some aspects, a user equipment (UE) may determine a reference time for updating one or more system information parameters associated with a non-terrestrial network (NTN) or updating a cell status associated with the NTN. The UE may determine an update timer length for updating the one or more system information parameters associated with the NTN or the cell status associated with the NTN. The UE may acquire, from a current cell or a new cell, a system information block (SIB) to refresh the one or more system information parameters after an expiration time associated with the one or more system information parameters, wherein the expiration time is based at least in part on the reference time and the update timer length. Numerous other aspects are described.

30 Claims, 8 Drawing Sheets

(56) References Cited

OTHER PUBLICATIONS

Mediatek Inc: "On Updating MAC Timers in NR-NTN", 3GPP TSG-RAN WG2 Meeting #111e, R2-2006638, 3rd Generation Partnership Project, Mobile Competence Centre, 650, Route Des Lucioles, F-06921 Sophia-Antipolis Cedex, France, vol. RAN WG2, No. Online, Aug. 17, 2020—Aug. 28, 2020, Aug. 6, 2020, XP051911568. 6 Pages.

* cited by examiner

SYSTEM INFORMATION PARAMETER UPDATE TIME IN NON-TERRESTRIAL NETWORK

FIELD OF THE DISCLOSURE

Aspects of the present disclosure generally relate to wireless communication and to techniques and apparatuses associated with a system information parameter update time in a non-terrestrial network (NTN).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining a reference time for updating one or more system information parameters associated with a non-terrestrial network (NTN) or updating a cell status associated with the NTN; determining an update timer length for updating the one or more system information parameters associated with the NTN or the cell status associated with the NTN; and acquiring, from a current cell or a new cell, a system information block (SIB) to refresh the one or more system information parameters after an expiration time associated with the one or more system information parameters, wherein the expiration time is based at least in part on the reference time and the update timer length.

In some aspects, a UE for wireless communication includes a memory and one or more processors, coupled to the memory, configured to: determine a reference time for updating one or more system information parameters associated with an NTN or updating a cell status associated with the NTN; determine an update timer length for updating the one or more system information parameters associated with the NTN or the cell status associated with the NTN; and acquire, from a current cell or a new cell, a SIB to refresh the one or more system information parameters after an expiration time associated with the one or more system information parameters, wherein the expiration time is based at least in part on the reference time and the update timer length.

In some aspects, a non-transitory computer-readable medium storing a set of instructions for wireless communication includes one or more instructions that, when executed by one or more processors of a UE, cause the UE to: determine a reference time for updating one or more system information parameters associated with an NTN or updating a cell status associated with the NTN; determine an update timer length for updating the one or more system information parameters associated with the NTN or the cell status associated with the NTN; and acquire, from a current cell or a new cell, a SIB to refresh the one or more system information parameters after an expiration time associated with the one or more system information parameters, wherein the expiration time is based at least in part on the reference time and the update timer length.

In some aspects, an apparatus for wireless communication includes means for determining a reference time for updating one or more system information parameters associated with an NTN or updating a cell status associated with the NTN; means for determining an update timer length for updating the one or more system information parameters associated with the NTN or the cell status associated with the NTN; and means for acquiring, from a current cell or a new cell, a SIB to refresh the one or more system information parameters after an expiration time associated with the one or more system information parameters, wherein the expiration time is based at least in part on the reference time and the update timer length.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
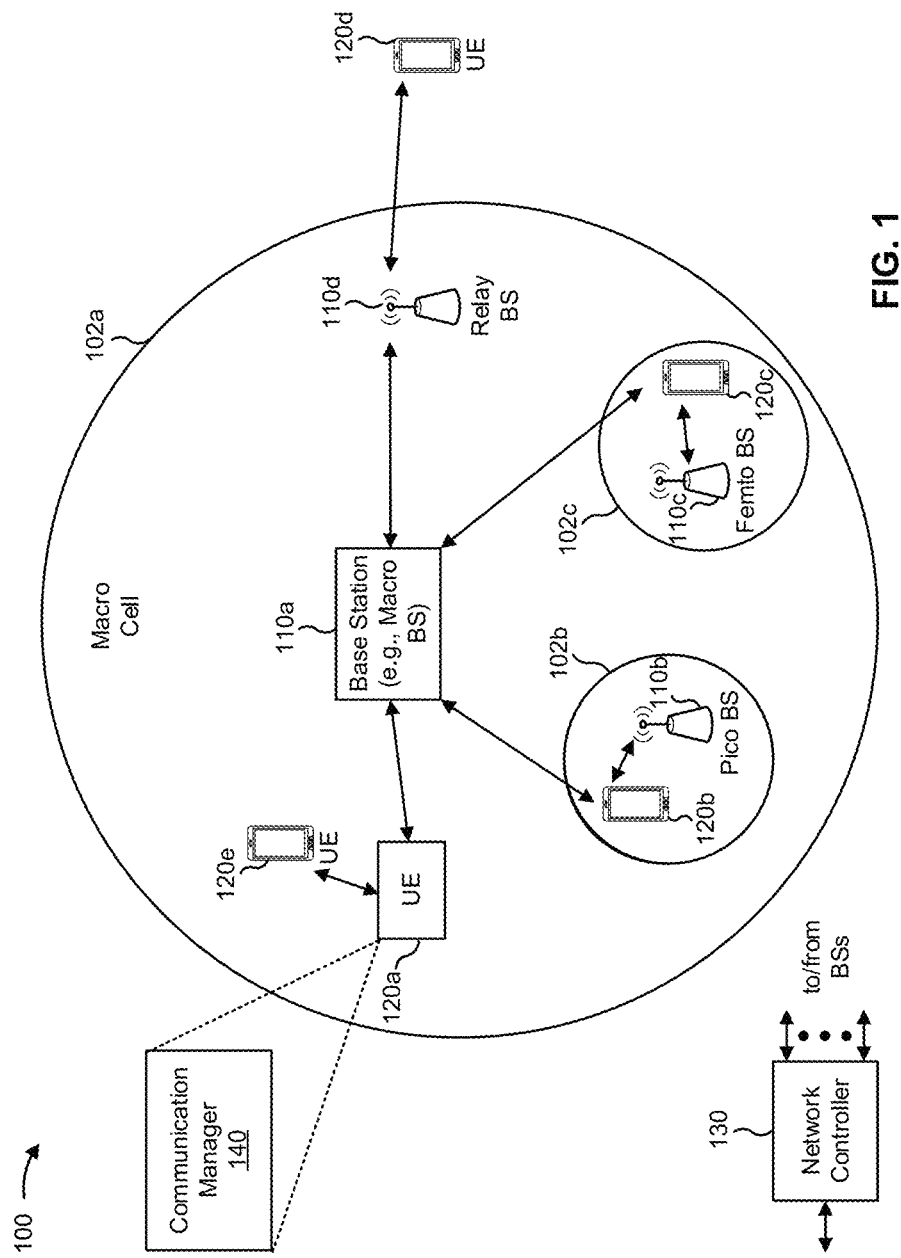
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

In some aspects, the wireless network 100 may include one or more non-terrestrial network (NTN) deployments in which a non-terrestrial wireless communication device may include a BS (referred to herein, interchangeably, as a "non-terrestrial BS" and "non-terrestrial base station") and/ or a relay station (referred to herein, interchangeably, as a "non-terrestrial relay station"). As used herein, an NTN may refer to a network for which access is facilitated by an NTN node, such as a non-terrestrial BS and/or a non-terrestrial relay station.

The wireless network 100 may include any number of non-terrestrial wireless communication devices or NTN nodes. A non-terrestrial wireless communication device (or NTN node) may include a satellite and/or a high-altitude platform (HAP). A satellite may include a low-earth orbit (LEO) satellite, a medium-earth orbit (MEO) satellite, a geostationary earth orbit (GEO) satellite, and/or a high elliptical orbit (HEO) satellite. A HAP may include a balloon, a dirigible, an airplane, a helicopter, and/or an unmanned aerial vehicle. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, and/or one or more components and/or devices included in a core network of wireless network 100.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D)

communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may determine a reference time for updating one or more system information parameters associated with an NTN or updating a cell status associated with the NTN, may determine an update timer length for updating the one or more system information parameters associated with the NTN or the cell status associated with the NTN, and may acquire, from a current cell or a new cell, a system information block (SIB) to refresh the one or more system information parameters after an expiration time associated with the one or more system information parameters. In some aspects, the expiration time may be based at least in part on the reference time and the update timer length. Additionally, or alternatively, the communication manager 140 may perform one or more other operations described herein.

As indicated above, FIG. 1 is provided as an example. Other examples may differ from what is described with regard to FIG. 1.

Figure 2:
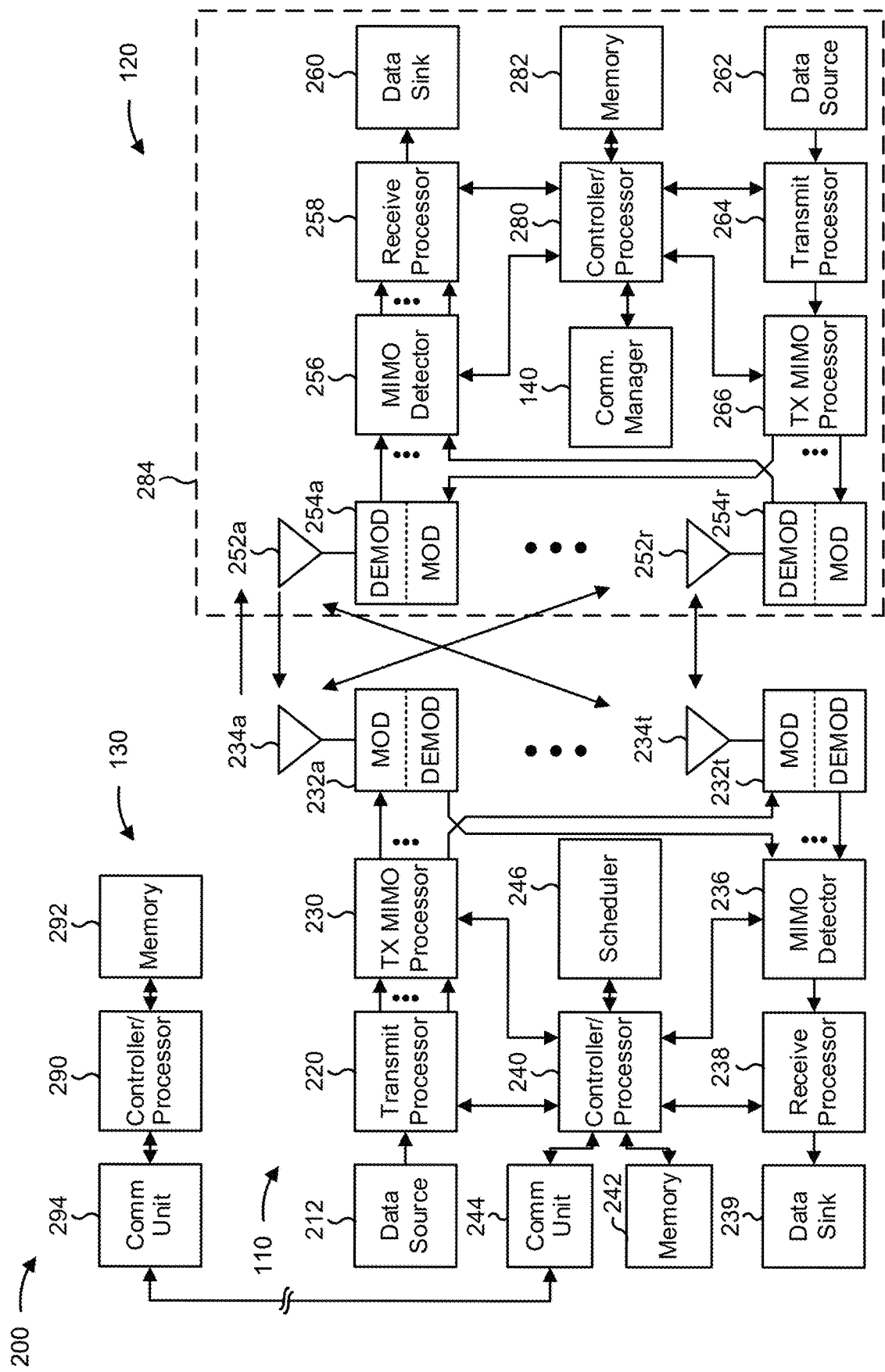
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., as described with reference to FIGS. 5A-5B and/or FIG. 6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., as described with reference to FIGS. 5A-5B and/or FIG. 6).

Controller/processor 240 of base station 110, controller/processor 280 of UE 120, and/or any other component(s) of FIG. 2 may perform one or more techniques associated with a system information parameter update time in a non-terrestrial network (NTN), as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, the UE 120 includes means for determining a reference time for updating one or more system information parameters associated with an NTN or updating a cell status associated with the NTN; means for determining an update timer length for updating the one or more system information parameters associated with the NTN or the cell status associated with the NTN; and/or means for acquiring, from a current cell or a new cell, a system information block (SIB) to refresh the one or more system information parameters after an expiration time associated with the one or more system information parameters, wherein the expiration time is based at least in part on the reference time and the update timer length. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
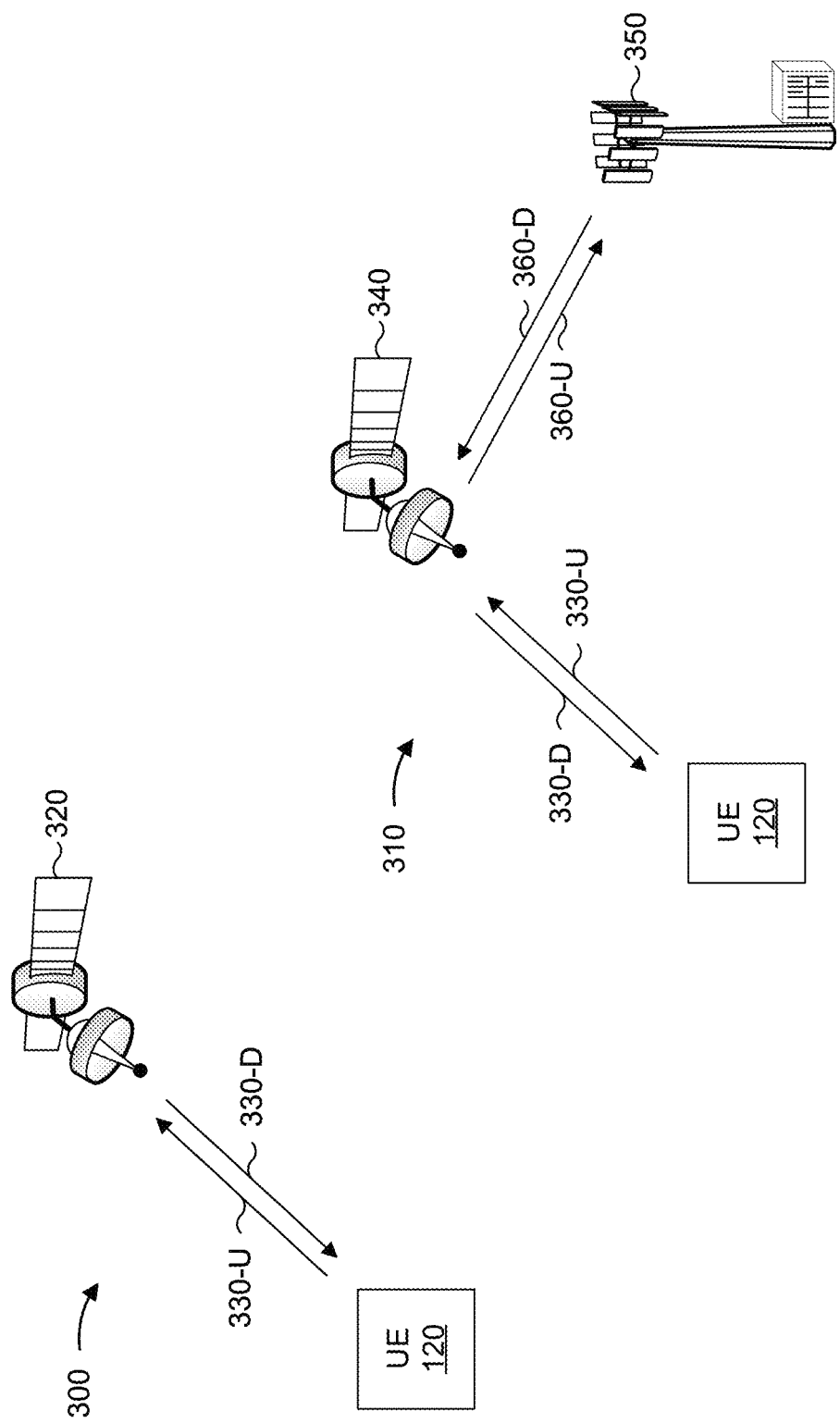
FIG. 3 is a diagram illustrating an example of a regenerative satellite deployment and an example of a transparent satellite deployment in a non-terrestrial network (NTN), in accordance with the present disclosure.

FIG. 3 is a diagram illustrating an example 300 of a regenerative satellite deployment and an example 310 of a transparent satellite deployment in a non-terrestrial network (NTN), in accordance with the present disclosure.

Example 300 shows a regenerative satellite deployment. In example 300, a UE 120 is served by a satellite 320 via a service link 330. For example, the satellite 320 may include a BS 110 (e.g., BS 110a) or a gNB. In some aspects, the satellite 320 may be referred to as a non-terrestrial base station, a regenerative repeater, and/or an on-board processing repeater, among other examples. In some aspects, the satellite 320 may demodulate an uplink radio frequency signal, and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be a transparent satellite. The satellite 340 may relay a signal received from a gateway 350 via a feeder link 360. For example, the satellite 340 may receive a radio frequency transmission from the gateway 350 via the feeder link 360, and may relay the radio frequency transmission to the UE 120 via the service link 330 without demodulating the radio frequency transmission. Additionally, or alternatively, the satellite 340 may receive a radio frequency transmission from the UE 120 via the service link 330 and may relay the radio frequency transmission to the gateway 350 via the feeder link 360 without demodulating the radio frequency transmission. In some aspects, the satellite 340 may frequency convert radio frequency transmissions received on the service link 330 to a frequency of the radio frequency transmission on the feeder link 360 (or vice versa) and may amplify and/or filter the relayed radio frequency transmission. In some aspects, the UEs 120 shown in example 300 and example 310 may be associated with a Global Navigation Satellite System (GNSS) capability or a Global Positioning System (GPS) capability, though not all UEs have such capabilities. The satellite 340 may provide a cell that covers the UE 120.

As shown in FIG. 3, the service link 330 may include a link between the satellite 340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120). As shown in FIG. 3, an uplink of the service link 330 is indicated by reference number 330-U and a downlink of the service link 330 is indicated by reference number 330-D. Similarly, an uplink of the feeder link 360 is indicated by reference number 360-U and a downlink of the feeder link 360 is indicated by reference number 360-D.

The feeder link 360 and the service link 330 may each experience Doppler effects due to the movement of the satellites 320 and 340, and potentially movement of a UE 120. The Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency. Furthermore, due to the long distance between the UE 120 and satellite 320/340, communication in an NTN may be associated with a much longer delay (e.g., a longer latency and/or a longer round trip time) than a delay associated with a terrestrial network. The delay may be even greater in a transparent satellite deployment, because any communication between the UE 120 and the gateway 350 must travel over the service link 330 and the feeder link 360, each of which may associated with a longer delay than a terrestrial network.

As indicated above, FIG. 3 is provided as an example. Other examples may differ from what is described with regard to FIG. 3.

Figure 4:
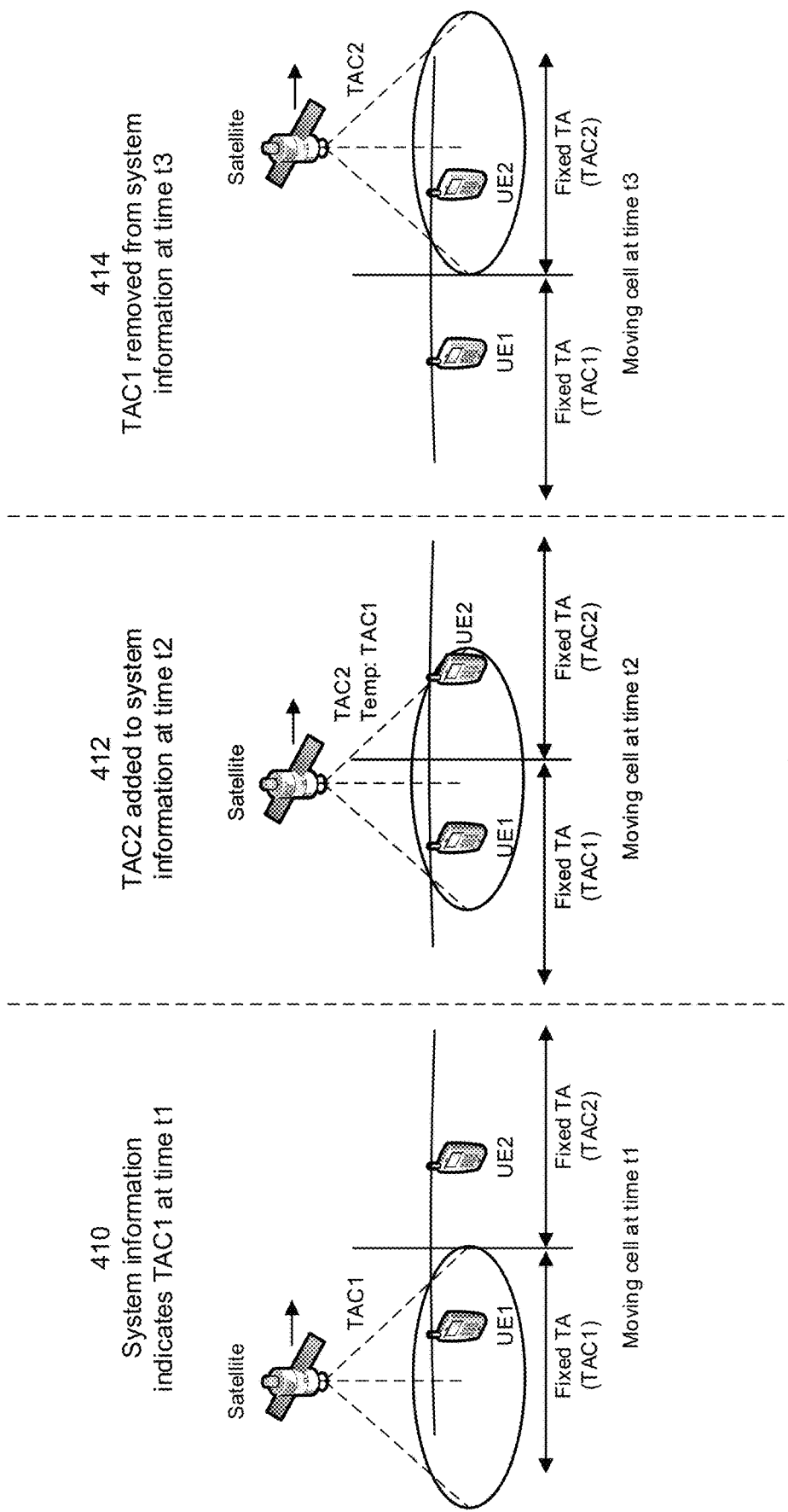
FIG. 4 is a diagram illustrating an example of an NTN system information parameter that may change over time, in accordance with the present disclosure.

FIG. 4 is a diagram illustrating an example 400 of an NTN system information parameter that may change over time, in accordance with the present disclosure. As shown in FIG. 4, example 400 includes a satellite that may communicate with one or more UEs (shown as UE1 and UE2) in an NTN. For example, in some aspects, the satellite may be associated with a regenerative satellite deployment or a transparent satellite deployment, as described in further detail above with reference to FIG. 3.

In a wireless network, a base station generally broadcasts a master information block (MIB) and one or more system information blocks (SIBS) that carry information to enable UEs to access the wireless network. For example, the MIB may carry information such as a system frame number (SFN) and information to enable reception and decoding of SIB1, which carries basic information that a UE requires for initial access and information that enables the UE to acquire any additional SIBs. For example, SIB1 may carry various parameters that relate to cell selection information, a public land mobile network (PLMN) list, a cell identifier, and/or a tracking area code (TAC), among other examples. Furthermore, SIB1 may carry scheduling information for one or more other SIBs, which may carry satellite-specific information such as ephemeris data to describe a trajectory of a satellite in an NTN (e.g., the ephemeris data may include time parameters such as a clock reference time, Keplerian parameters such as a square root of a semi-major axis, an eccentricity, and/or an inclination angle, and/or perturbation parameters such as a mean motion difference from a computed value, a rate of change of right ascension and/or inclination, and/or amplitudes of one or more sine or cosine harmonic correction terms, among other examples).

Accordingly, in an NTN, there are some system information parameters that are handled differently than terrestrial networks due to a need to periodically update the system information parameters as the position of a satellite changes relative to the ground. For example, because ephemeris data is used to describe the trajectory of a satellite in the sky, ephemeris data is generally specific to an NTN and there are no ephemeris-like system information parameters in a terrestrial network. In another example, whereas a TAC indicated in a SIB1 is fixed per cell and does not change in a terrestrial network, the TAC associated with a satellite may change over time as the position of the satellite changes relative to the ground. Furthermore, depending on the position of the satellite, the satellite may be associated with more than one TAC at a particular time. Accordingly, in an NTN, the network may broadcast (e.g., in SIB1) more than one TAC per PLMN in a cell. For example, as shown in FIG. 4, and by reference number 410, the satellite may have a coverage area that falls within a first Earth-fixed tracking area at time t1, whereby a SIB1 broadcast at time t1 may indicate a TAC associated with the first Earth-fixed tracking area (shown as TAC1). As further shown by reference number 412, the position of the satellite relative to the ground has changed at time t2 such that the coverage area of the satellite includes a portion of the first Earth-fixed tracking area and a portion of a second Earth-fixed tracking area. Accordingly, a TAC associated with the second Earth-fixed tracking area (shown as TAC2) may be added to the SIB1 that is broadcast at time t2. As further shown by reference number 414, the position of the satellite relative to the ground changes again at time t3 such that the coverage area of the satellite falls within the second Earth-fixed tracking area and no longer covers any portion of the first Earth-fixed tracking area. Accordingly, the TAC associated with the first Earth-fixed tracking area may be removed from the SIB1 that is broadcast at time t3.

In general, when one or more system information parameters are updated, a UE is typically notified via a paging message, and the UE is then expected to reacquire one or more SIBs to refresh the one or more system information parameters. For example, in an NTN, the paging message may notify the UE to reacquire SIB1 when the TAC associated with the satellite changes such that the UE can verify that the UE is camping in a cell that supports the tracking area in a configured list associated with the UE. Furthermore, a similar approach may be used to refresh the ephemeris data associated with the satellite. However, transmitting a paging message to inform the UE when system information parameters need to be updated may lead to signaling overhead, which may be particularly problematic in an NTN due to large propagation delays and/or satellite motion potentially resulting in frequent changes to the system information parameters. One possible technique to ensure that the UE periodically reacquires one or more SIBs to refresh system information parameters without explicitly informing the UE (e.g., without triggering a system information update procedure via a paging message) may be to provide an expiration time for each system information parameter that is expected to change over time. For example, an expiration time may be provided for each TAC in each PLMN (e.g., depending on the size of each tracking area and/or the trajectory of the satellite) and/or to limit a time period that ephemeris data is considered valid (e.g., from thirty (30) minutes to four (4) hours). However, broadcasting the expiration time for each system information parameter that may become stale or otherwise need to be updated adds significant signaling overhead.

Some aspects described herein relate to techniques and apparatuses to enable a UE to implicitly determine an update time when the UE is to acquire (or reacquire) one or more SIBs to update or refresh one or more system information parameters (e.g., without reliance a paging message or other notification to explicitly indicate when the UE is to update the one or more system information parameters). For example, when a UE acquires a SIB that indicates one or more system information parameters (e.g., a TAC carried in SIB1 and/or ephemeris data carried in an NTN-specific SIB, among other examples), an update timer length may be explicitly or implicitly signaled to the UE. Furthermore, the UE may determine a reference time associated with one or more system information parameters that are to be periodically refreshed. For example, in some aspects, the reference time may be based on a boundary of a system information modification period, a boundary of a system information period, a boundary of a scheduling window, and/or a specific SFN. Accordingly, the UE may determine an expiration time for the one or more system parameters based on the reference time and the update timer length, and the UE may acquire one or more SIBs to refresh the one or more system parameters after the expiration time. In this way, the UE may acquire updated or refreshed values for the one or more system parameters with reduced signaling overhead (e.g., without notifying the UE to update the one or more system parameters or indicating the expiration time of the one or more system parameters).

As indicated above, FIG. 4 is provided as an example. Other examples may differ from what is described with regard to FIG. 4.

Figure 5A:
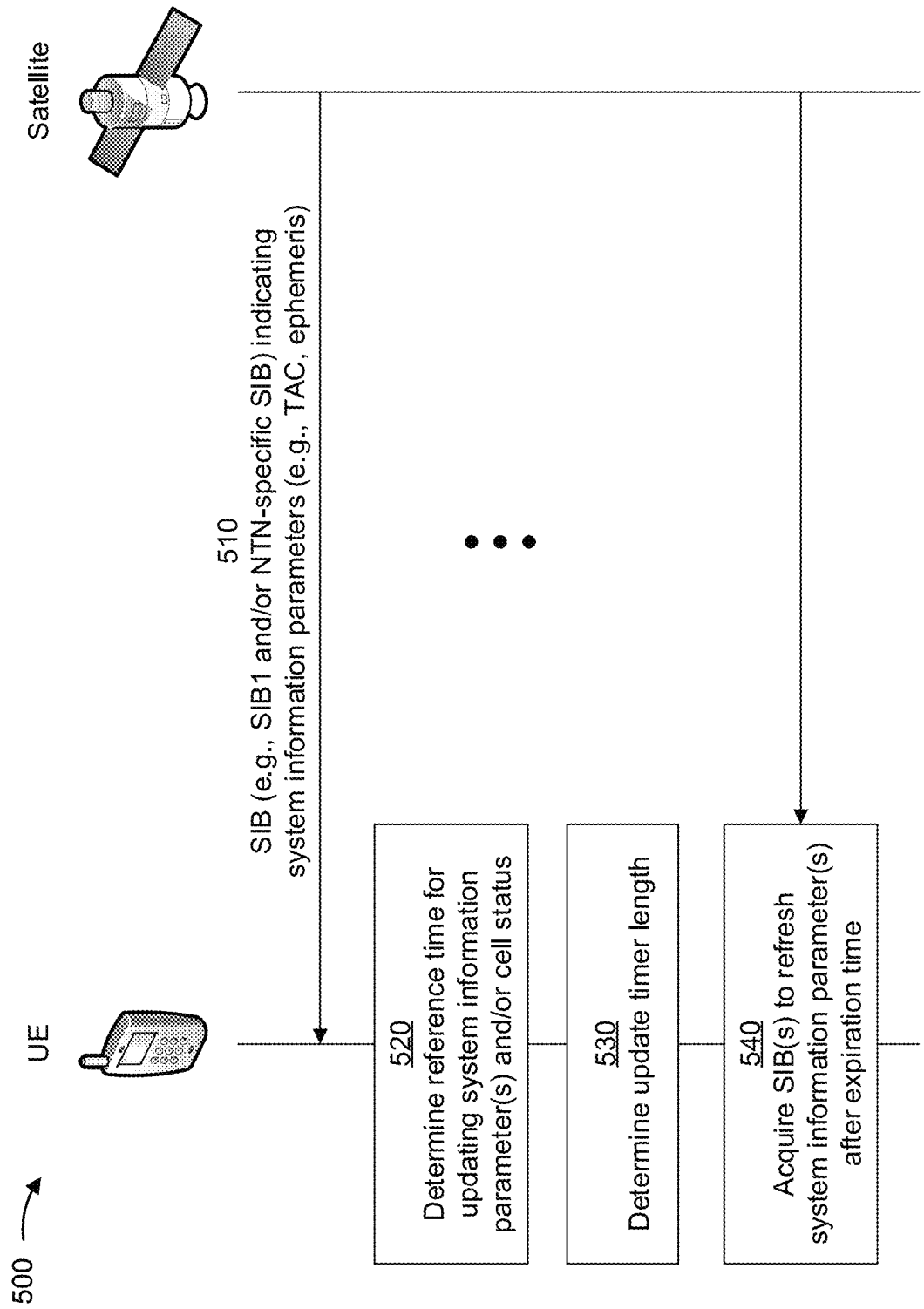
FIGS. 5A-5B are diagrams illustrating one or more examples associated with a system information parameter update time in an NTN, in accordance with the present disclosure.
Figure 5B:
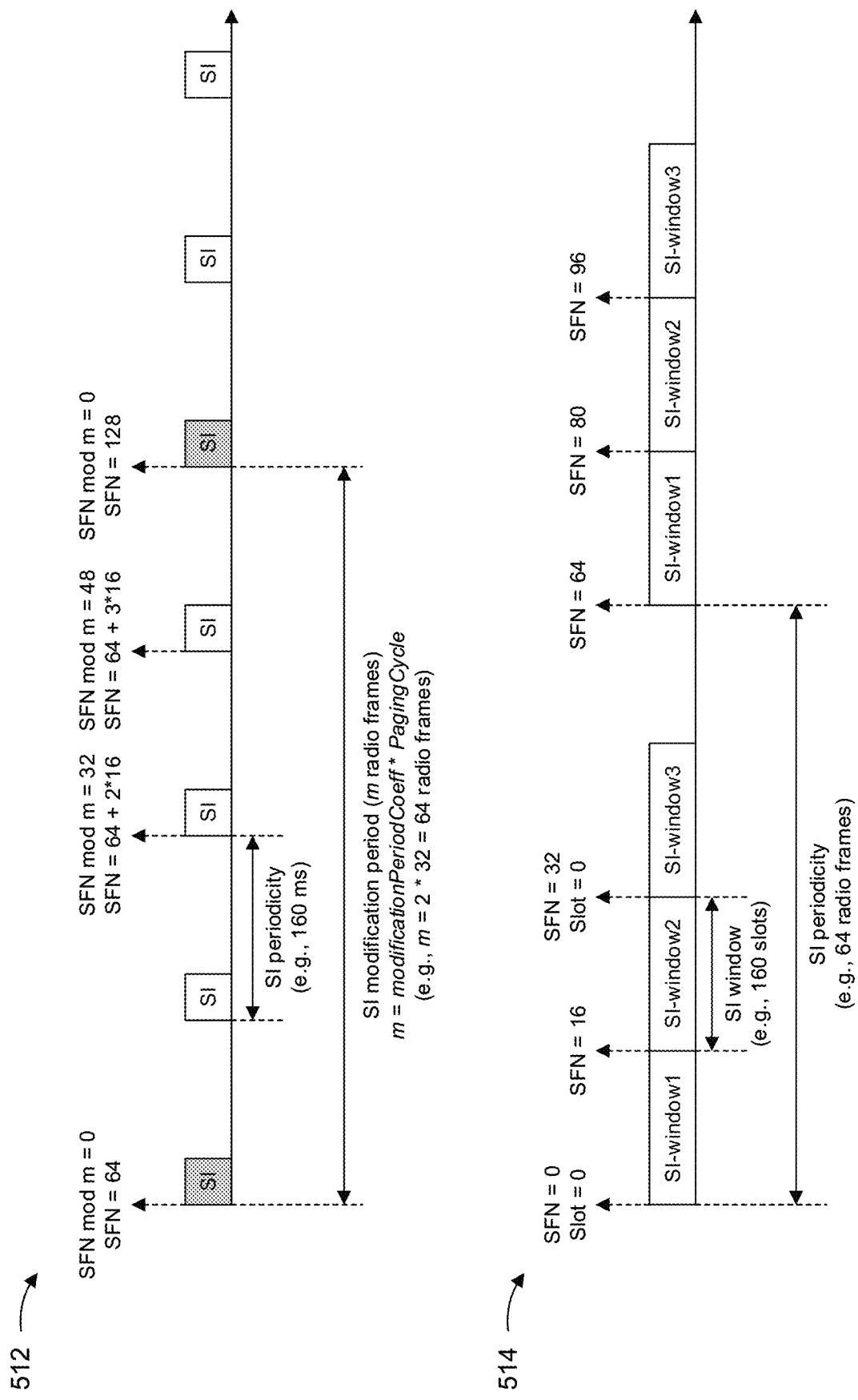

FIGS. 5A-5B are diagrams illustrating one or more examples 500 associated with a system information parameter update time in an NTN, in accordance with the present disclosure. As shown in FIGS. 5A-5B, example(s) 500 include communication between a satellite and a UE. In some aspects, the satellite and the UE may communicate with one another in an NTN. For example, in some aspects, the satellite may be associated with a regenerative satellite deployment or a transparent satellite deployment, and the satellite may communicate with the UE via a wireless service link, which may include an uplink and/or a downlink.

As shown in FIG. 5A, and by reference number 510, the satellite may transmit, and the UE may receive, a system information block (SIB) that indicates one or more system information parameters associated with an NTN. In some aspects, the SIB may include a SIB1 that indicates various parameters related to accessing a cell associated with the satellite. For example, the SIB1 may configure one or more PLMN identities and additional information associated with the one or more PLMN identities, such as a tracking area code (TAC) that indicates a tracking area to which the cell belongs (e.g., to identify a tracking area within the scope of a PLMN). Accordingly, in some aspects, the one or more system information parameters associated with the NTN may include one or more TACs that are indicated in a SIB1. Additionally, or alternatively, the SIB that is transmitted by the satellite and received by the UE may include a SIB other than SIB1 (e.g., an NTN-specific SIB) that carries information specific to the satellite, such as ephemeris data to describe a trajectory of the satellite. For example, as described above, the ephemeris data may include time parameters (e.g., a clock reference time), Keplerian parameters (e.g., a square root of a semi-major axis, an eccentricity, and/or an inclination angle), and/or perturbation parameters (e.g., a mean motion difference from a computed value, a rate of change of right ascension and/or inclination, and/or amplitudes of one or more sine or cosine harmonic correction terms).

In general, as described above, the one or more TACs that are indicated in the SIB1 and/or the ephemeris data indicated in another SIB may change from time to time (e.g., the TAC may change as the position of the satellite changes relative to the ground and/or the ephemeris data may change due to variations in the trajectory of the satellite in the sky). Additionally, or alternatively, a cell status associated with the NTN may change from time to time (e.g., as one or more cells are switched off and/or added to the NTN). Accordingly, as described herein, the UE may need to periodically reacquire the SIB(s) that indicate system information parameters that are updated over time in an NTN (e.g., the TAC and/or ephemeris data associated with the satellite). For example, in order to configure the UE to refresh or otherwise update certain system information parameters without reliance on explicit signaling (e.g., a paging message) to indicate when the UE is to update the system information parameters, the UE may generally need to implicitly determine (e.g., autonomously or with minimal signaling) an expiration time for the TAC, ephemeris data, and/or any other system information parameters to be periodically refreshed or updated. Accordingly, in some aspects, the UE may determine a reference time and an update timer length for updating each system information parameter to be periodically refreshed or updated and/or for updating a cell status associated with the NTN.

For example, as described herein, the UE may be configured to implicitly determine, without an explicit indication, the reference time for determining when the next TAC update is to occur, the reference time for determining when the next ephemeris update is to occur, and/or the reference time for updating the cell status associated with the NTN based on a periodic structure associated with the SIB that indicates the value for the corresponding system information parameter (e.g., SIB1 used to indicate the TAC associated with the cell provided by the satellite and/or an NTN-specific SIB used to indicate the ephemeris data for the satellite). Furthermore, as described in further detail below, the update timer length may be explicitly or implicitly signaled by the satellite, or the update timer length may be defined (e.g., in a wireless communication standard), such that the UE can determine the expiration time of the system information parameters based on the reference time and the update timer length (e.g., an update timer for a system information parameter may start to run at the reference time, and the system information parameter may expire after the update timer length). In some aspects, the update timer length may also be indicated according to a periodic structure associated with the SIB that indicates the value for the corresponding system information parameter.

For example, FIG. 5B illustrates an example 512 of a periodic SIB structure associated with a SIB1 that indicates one or more TACs associated with the satellite and/or another SIB (e.g., an NTN-specific SIB) that may indicate ephemeris data associated with the satellite. For example, in cases where the SIB is a SIB1, the SIB1 may be transmitted on a downlink shared channel (e.g., a physical downlink shared channel (PDSCH)) with a fixed periodicity (shown as SI periodicity) of 160 milliseconds (ms) and a variable transmission repetition periodicity within 160 ms. As further shown, the periodic structure of the SIB may include a system information modification period, which generally refers to a period during which system information parameters carried in the SIB do not change. In other words, system information parameters carried in a SIB can be changed only in a first SIB transmission in a system information modification period (shaded in gray in FIG. 5A), and each subsequent SIB transmission within a system information modification period is a repetition of the first SIB transmission in the current system information modification period.

In general, as shown by example 512, a boundary of a system information modification period may be defined by system frame number (SFN) values for which SFN mod m=0, where m is the number of radio frames in a system information modification period. In some aspects, the value of m may be determined based on a configured coefficient value (e.g., modificationPeriodCoeff), which may have a value of 2, 4, 8, or 16, and a default paging cycle (e.g., PagingCycle), which may have a value of 32, 64, 128, or 256 radio frames. For example, in cases where the configured coefficient value is two (2) and the default paging cycle is thirty-two (32) radio frames, the system information modification period may include sixty-four (64) radio frames. Accordingly, as described herein, any change in a system information parameter may be updated in the corresponding SIB at the boundary of the system information period, and the UE may generally have a capability to implicitly determine the SFN associated with the most recent system information modification boundary and the SFN associated with the next system information modification boundary (e.g., a starting boundary of the current system information modification period). The SFN may generally wrap around after an SFN wrap-around period, which may include 1024 frames that each have a ten (10) ms duration, whereby the SFN wraps around every 10.24 seconds such that the system information modification period cannot be longer than 10.24 seconds.

In some aspects, as described above, SIB1 carries information that may be necessary to enable access to a cell provided by the satellite and is therefore transmitted with a fixed periodicity of 160 ms. However, SIB1 may contain scheduling information for one or more other SIBs, which may have a similar periodic structure as SIB1 except that the periodic structure of other SIBs (e.g., a SIB that carries information to indicate NTN-specific parameters, such as ephemeris data) may be more flexibly configured. For example, as further shown in FIG. 5B, and by example 514, a SIB other than SIB1 may be associated with a configurable system information periodicity, which may have a value of 8, 16, 32, 64, 128, 256, or 512 radio frames (e.g., 64 radio frames in example 514). Furthermore, the SIB may be associated with a scheduling window parameter (e.g., si-Window Length), which may have a value of 5, 10, 20, 40, 80, 160, 320, 640, or 1280 subframes to define the length of a system information window in which the UE can expect the SIB to be transmitted. Accordingly, for a SIB other than SIB1, a system information modification period may include one or more system information periods (e.g., depending on the value of m that indicates the number of radio frames in the system information modification period and the value of an si-Periodicity parameter that indicates the number of radio frames in the system information period), and each system information period may include one or more system information scheduling windows during which the SIB is transmitted.

As further shown in FIG. 5A, and by reference number 520, the UE may determine the reference time associated with updating a system information parameter and/or updating a cell status, which may be based at least in part on the periodic structure of a SIB that is used to indicate the value of the system information parameter. For example, in the case of a TAC that has a value indicated in SIB1, the UE may implicitly determine (e.g., without an explicit indication) that the reference time for the TAC is a boundary of a system information modification period in which the UE acquired the SIB1 indicating the current TAC associated with the satellite. Similarly, in the case of ephemeris data indicated in a SIB other than SIB1, the UE may implicitly determine that the ephemeris reference time is a boundary of a system information modification period in which the UE acquired the SIB indicating the current ephemeris associated with the satellite. For example, in either case, the boundary of the system information modification period may correspond to the start of the system information modification period in which the UE acquired the SIB indicating the current value of the appropriate system information parameter (e.g., the most recent SFN for which SFN mod m=0). Alternatively, the boundary of the system information modification period may correspond to the end of the system information modification period in which the UE acquired the SIB that indicates the current value of the TAC and/or ephemeris data associated with the satellite (e.g., the next SFN for which SFN mod m=0, which also represents the starting boundary of the next system information modification period). In such cases, the next update time when the TAC, ephemeris data, and/or cell status is refreshed may occur at the boundary of each system information modification period.

Alternatively, in some aspects, the UE may implicitly determine that the reference time for updating the TAC, the ephemeris data, and/or the cell status associated with the NTN is a boundary of a system information period within a system information modification period. For example, as described above, a system information modification period may include one or more system information periods, and the reference time may correspond to the boundary at the start or the end of any suitable system information period within a system information modification period. In this case, the reference time for updating the TAC, ephemeris data, and/or cell status associated with the satellite may be the boundary of the nth system information period associated with the SIB that indicates the TAC, ephemeris data, and/or cell status, and the next update time when the TAC, ephemeris data, and/or cell status is refreshed may occur at the boundary of each system information period (e.g., more frequently than when the boundary of the system information modification period is used as the reference time).

Alternatively, in some aspects, the UE may implicitly determine that the reference time for updating the TAC, ephemeris data, and/or cell status is an SFN that has a configured value. For example, as described above, an SFN wrap-around period may generally include a number of radio frames, and the reference time for updating the TAC, ephemeris data, and/or cell status may be an SFN having a value of x, where x has a value between 0 and z and z is one less than the number of radio frames in an SFN wrap-around period. For example, in a hyper-SFN configuration where the SFN wrap-around period includes 1024 radio frames, the radio frames may be indexed from 0 to 1023 such that the reference time for updating the TAC, ephemeris data, and/or cell status may be an SFN having a value of x, where x has a value between 0 and 1023. In this case, regardless of the system information modification period, the next update time when the TAC, ephemeris data, and/or cell status is refreshed may occur at each SFN having a value equal to x, which occurs every 10.24 seconds in the case of an SFN wrap-around period with 1024 radio frames that each cover 10 ms. Furthermore, in some aspects, the value of x may correspond to an SFN where a boundary of an nth system information modification period occurs (e.g., the configured SFN value may be selected to coincide with any suitable system information modification period boundary within the SFN wrap-around period).

In some aspects, in cases where the system information parameter(s) to be refreshed include ephemeris data and/or other suitable system information parameters that are indicated in a SIB other than SIB1, the reference time may correspond to the start of a system information scheduling window within a system information period. For example, in FIG. 5B, example 514 illustrates a periodic SIB structure in which a system information period includes three system information scheduling windows. Accordingly, in some aspects, the UE may determine that the reference time for ephemeris data and/or other system information parameters that are indicated in a SIB other than SIB1 is the boundary of the nth system information scheduling window within a system information period.

As further shown in FIG. 5A, and by reference number 530, the UE may determine an update timer length for the system information parameters. For example, as described herein, the reference time and the update timer length for a particular system information parameter (e.g., a TAC or ephemeris data) and/or cell status (e.g., a cell to be switched off and/or added to the NTN) may generally indicate the expiration time for the system information parameter and/or cell status. For example, the update timer length may indicate a duration that a value of a system information parameter and/or a cell status is considered valid, starting from the reference time. In this way, the reference time and the update timer length may indicate the expiration time for the system information parameter and/or cell status such that the UE may (re)acquire the SIB that indicates the most recent value of the system information parameter for one or more cells after the expiration time that is determined from the reference time and the update timer length. In this way, the satellite can modify the next update time for a system information parameter and/or a cell status at any time without needing to notify the UE about the change of the update time in a SIB. For example, after the UE acquires SIB1 indicating one or more TACs associated with the satellite and/or another SIB indicating the ephemeris data associated with the satellite, the UE may acquire the appropriate SIB to read the current TAC(s) and/or ephemeris data associated with the satellite again at the next update time.

For example, in some aspects, the satellite may signal the update timer length to the UE in the SIB that indicates the value of the system information parameter that the UE is to refresh at the next update time. In general, the update timer length may be indicated with respect to the reference time that is implicitly determined by the UE such that the UE may determine the expiration time for the system information parameter with minimal to no signaling. For example, in some aspects, the update timer length may be signaled as an absolute time value within a range of possible values, as an integer multiple of a system information modification period such that the system information parameter expires after one or multiple system information modification periods, as an integer multiple of a system information period such that the system information parameter expires after one or multiple system information periods, as an integer multiple of a system information scheduling window, or as an integer multiple of a paging discontinuous reception (DRX) cycle.

Additionally, or alternatively, the update timer length may be based on a modification period that has a length based on the number of radio frames in an SFN wrap-around period. For example, in the case of a hyper-SFN configuration where an SFN wraps around every 10.24 seconds (e.g., 1024 SFN), the UE may determine the reference time as described above and the modification period may be determined according to a signaled value, p. For example, to cover a 5 minute period for an H-SFN configuration where the SFN wrap-around period is 10.24 seconds, which may suffice in most moving cell cases, the satellite may signal a value of p=30 H-SFN=307.2 seconds. After the pth H-SFN period, the UE may update the appropriate system information parameters at the boundary of the qth system information modification period or system information period, where one H-SFN wrap-around period may generally include q or more system information modification periods. In some aspects, the H-SFN value may be indicated as a 10-bit value in SIB1 or an NTN-specific SIB, and the value of p may be indicated as a 5-bit value (although more bits may be used to indicate a larger value for p at the cost of additional signaling overhead). In some aspects, the update timer length may be based on a combination of an integer multiple of the number of radio frames in an SFN wrap-around period and an integer multiple of another time duration, such as a system information modification period, a system information period, a system information scheduling window, or a paging DRX cycle.

Alternatively, in some aspects, the update timer length may be implicitly indicated by an absence of an indication for the update timer length. For example, in some aspects, a default value may be configured for the update timer length (e.g., five minutes), whereby an absence of an explicit indication for the update timer length may indicate to the UE that the next update for a corresponding system information parameter will not occur until the default value for the update timer length has elapsed. In such cases, the UE may be expected to acquire the SIB to refresh the value of the system information parameter at least once per time unit (e.g., at least once every five minutes if the default value for the update timer length is five minutes). Furthermore, in some aspects, the default value for the update timer length may be based on a cell size associated with the satellite (e.g., an amount of time after which the TAC may be expected to change for a cell moving at a speed of the satellite, such as 67 seconds for a moving cell having a size of 500 kilometers). Furthermore, in cases where the update timer length is indicated for a hard TAC update (e.g., where each cell can broadcast only one TAC), the update timer length may be specific to a PLMN in cases where only one TAC is broadcast per PLMN, specific to a TAC in cases where a PLMN list is used to signal the update timer length, or specific to a cell associated with the satellite where multiple PLMNs share the same Earth-fixed tracking area for the same cell (e.g., a common update timer length can be signaled for all PLMNs to indicate when the cell is expected to leave a tracking area and/or enter a new tracking area). Furthermore, in cases where the update timer length is indicated for a soft TAC update (e.g., where multiple TACs can be broadcast per PLMN), multiple TACs associated with adjacent tracking areas may have different expiration times. Accordingly, for a soft TAC update, the update timer length for each TAC may be signaled per PLMN or per TAC, or a single common time may be indicated to inform the UE when the moving cell will enter or leave a tracking area since the tracking areas are Earth-fixed.

As further shown in FIG. 5A, and by reference number 540, the UE may acquire, from a current cell or a new cell, one or more SIBs to refresh one or more system information parameters after an expiration time associated with each respective system information parameter to be refreshed. For example, as described above, the UE may determine a reference time for a TAC broadcast in SIB1, a reference time for ephemeris data broadcast in an NTN-specific SIB, and/or a reference time for another suitable parameter that may need to be periodically refreshed. For example, as described above, the reference time for a system information parameter may be the boundary (e.g., start or end) of a system information modification period, a system information period within a system information modification period, a system information scheduling window within a system information period, and/or an SFN having a specific value or index. Furthermore, the update timer length, which is defined relative to the reference time, may be signaled to the UE or implicitly determined by the UE (e.g., in an absence of signaling that indicates the value of the update timer length). Accordingly, the reference time and the update timer length may determine the expiration time for the system information parameter, and the UE may acquire, from a current cell or a new cell, the SIB to refresh the value for the system information parameter after the expiration time. In this way, the UE may be provided with updated values for system information parameters that may change from time to time in an NTN network without reliance on a paging message or other explicit notification to indicate when the UE is to refresh the system information parameters and/or excessive signaling overhead to explicitly indicate the expiration time for each system information parameter that the UE is to periodically refresh.

As indicated above, FIGS. 5A-5B are provided as one or more examples. Other examples may differ from what is described with regard to FIGS. 5A-5B.

Figure 6:
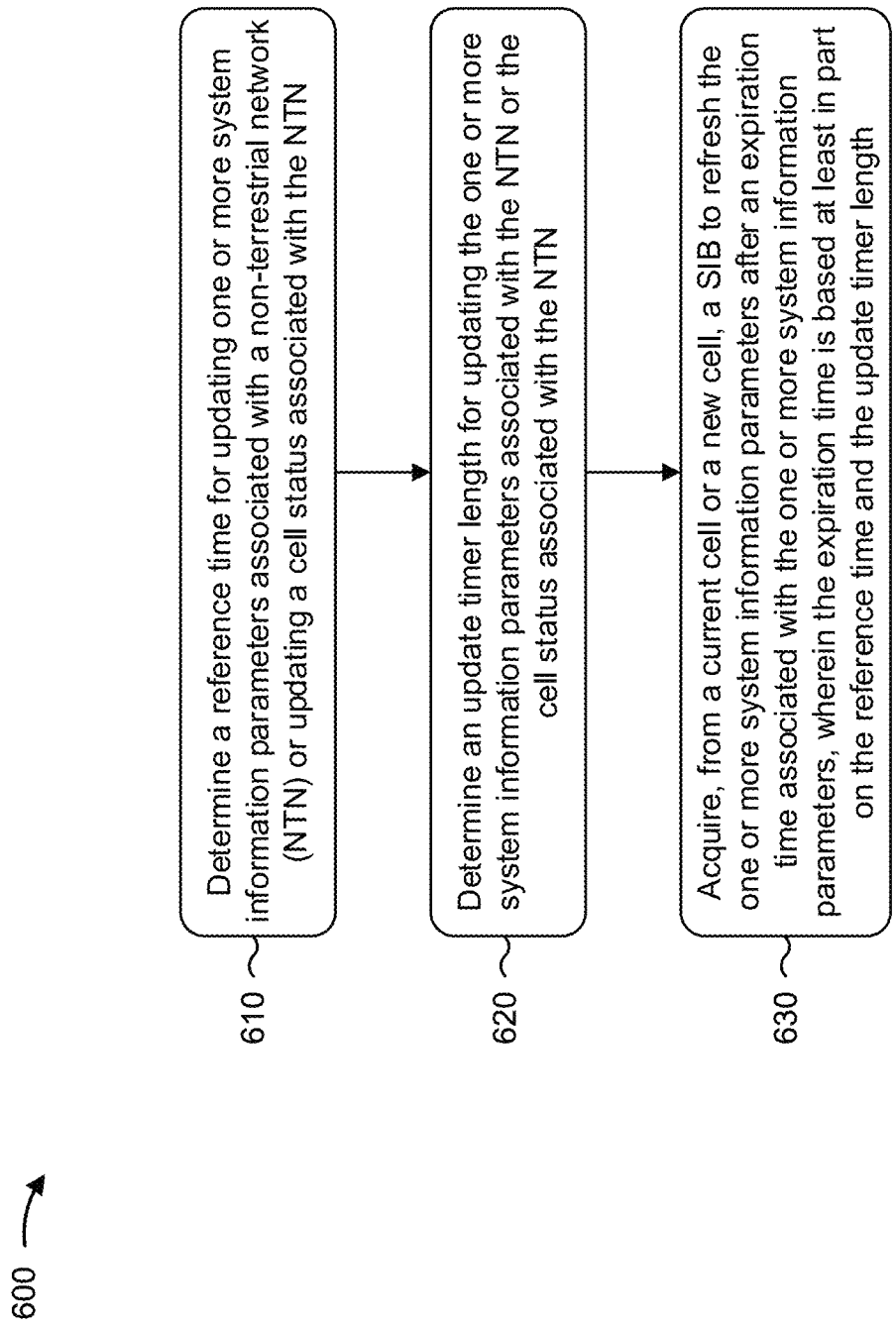
FIG. 6 is a diagram illustrating an example process associated with a system information parameter update time in an NTN, in accordance with the present disclosure.

FIG. 6 is a diagram illustrating an example process 600 performed, for example, by a UE, in accordance with the present disclosure. Example process 600 is an example where the UE (e.g., UE 120) performs operations associated with a system information parameter update time in an NTN.

As shown in FIG. 6, in some aspects, process 600 may include determining a reference time for updating one or more system information parameters associated with an NTN or updating a cell status associated with the NTN (block 610). For example, the UE (e.g., using determination component 708, depicted in FIG. 7) may determine a reference time for updating one or more system information parameters associated with an NTN or updating a cell status associated with the NTN, as described above.

As further shown in FIG. 6, in some aspects, process 600 may include determining an update timer length for updating the one or more system information parameters associated with the NTN or the cell status associated with the NTN (block 620). For example, the UE (e.g., using determination component 708, depicted in FIG. 7) may determine an update timer length for updating the one or more system information parameters associated with the NTN or the cell status associated with the NTN, as described above.

As further shown in FIG. 6, in some aspects, process 600 may include acquiring, from a current cell or a new cell, a SIB to refresh the one or more system information parameters after an expiration time associated with the one or more system information parameters, wherein the expiration time is based at least in part on the reference time and the update timer length (block 630). For example, the UE (e.g., using acquisition component 710, depicted in FIG. 7) may acquire, from a current cell or a new cell, a SIB to refresh the one or more system information parameters after an expiration time associated with the one or more system information parameters, wherein the expiration time is based at least in part on the reference time and the update timer length, as described above.

Process 600 may include additional aspects, such as any single aspect or any combination of aspects described below and/or in connection with one or more other processes described elsewhere herein.

In a first aspect, the reference time is a boundary of a system information modification period.

In a second aspect, alone or in combination with the first aspect, the reference time is a boundary of a system information periodicity within a system information modification period.

In a third aspect, alone or in combination with one or more of the first and second aspects, the reference time is a system frame that has a configured SFN.

In a fourth aspect, alone or in combination with one or more of the first through third aspects, the reference time is a boundary of a system information scheduling window within a system information period.

In a fifth aspect, alone or in combination with one or more of the first through fourth aspects, determining the update timer length includes receiving signaling that indicates a value of the update timer length from a range of configured values for the update timer length.

In a sixth aspect, alone or in combination with one or more of the first through fifth aspects, determining the update timer length includes receiving signaling that indicates a value of the update timer length as an integer multiple of a duration associated with a system information modification period.

In a seventh aspect, alone or in combination with one or more of the first through sixth aspects, determining the update timer length includes receiving signaling that indicates a value of the update timer length as an integer multiple of a duration associated with a paging DRX cycle or a predefined time duration.

In an eighth aspect, alone or in combination with one or more of the first through seventh aspects, determining the update timer length includes receiving signaling that indicates a value of the update timer length as an integer multiple of a duration associated with a system information periodicity or a system information scheduling window.

In a ninth aspect, alone or in combination with one or more of the first through eighth aspects, determining the update timer length includes receiving signaling that indicates a value of the update timer length as an integer multiple of a number of system frames in a SFN wrap-around period.

In a tenth aspect, alone or in combination with one or more of the first through ninth aspects, determining the update timer length includes receiving signaling that indicates a value of the update timer length as a combination of an integer multiple of a time duration and an integer multiple of a number of system frames in a system frame number wrap-around period.

In an eleventh aspect, alone or in combination with one or more of the first through tenth aspects, the update timer length has a default value in an absence of signaling that indicates a value of the update timer length.

In a twelfth aspect, alone or in combination with one or more of the first through eleventh aspects, the update timer length is associated with updating the one or more system parameters or updating a time when a cell is to be switched off or added to the NTN.

In a thirteenth aspect, alone or in combination with one or more of the first through twelfth aspects, the update timer length is specific to a PLMN, a TAC, or a cell that includes multiple PLMNs sharing a common TAC update timing.

In a fourteenth aspect, alone or in combination with one or more of the first through thirteenth aspects, the one or more system information parameters include one or more of a TAC or ephemeris data.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
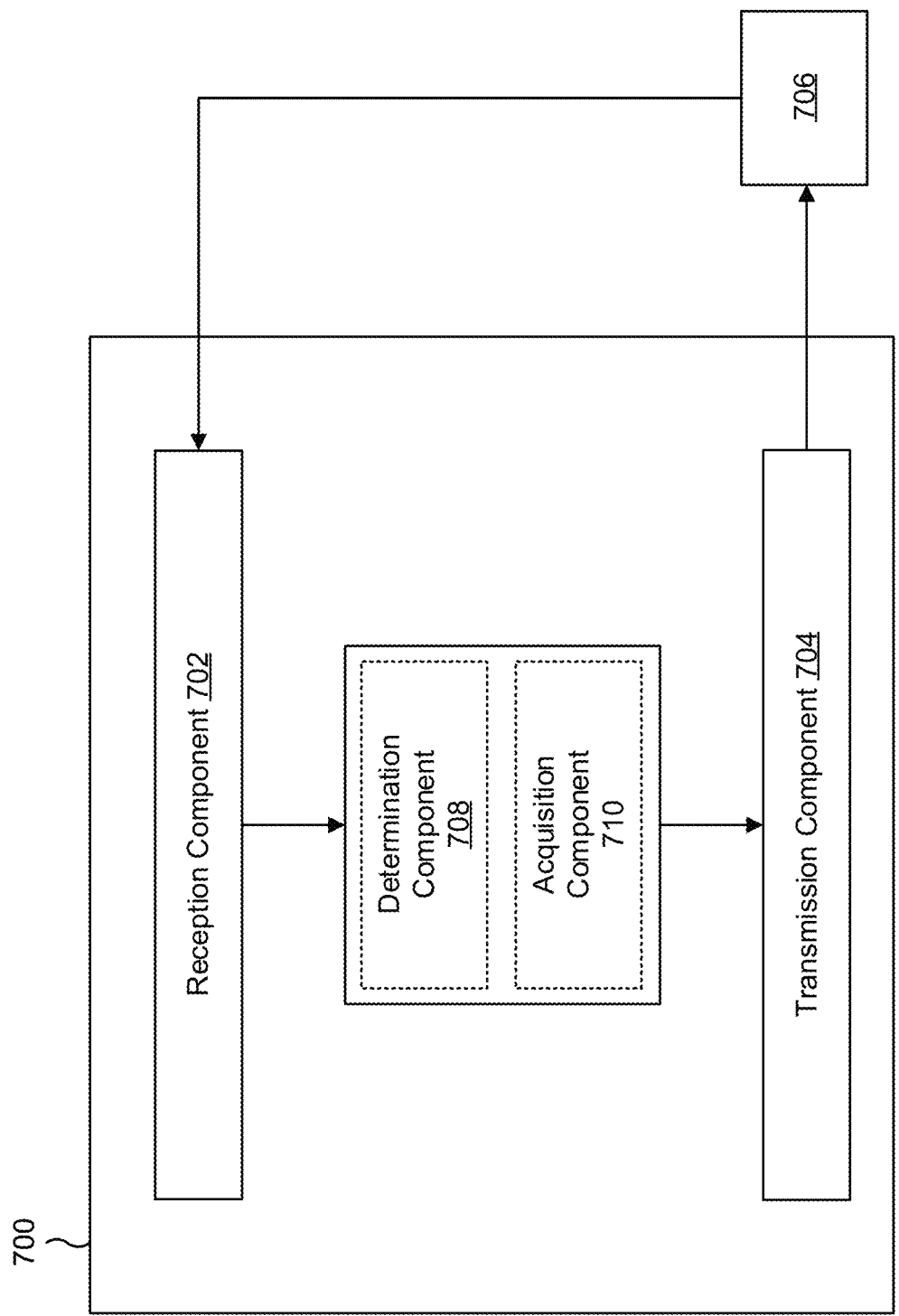
FIG. 7 is a block diagram of an example apparatus for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a determination component 708 or an acquisition component 710, among other examples.

In some aspects, the apparatus 700 may be configured to perform one or more operations described herein in connection with FIGS. 5A-5B. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The determination component 708 may determine a reference time for updating one or more system information parameters associated with an NTN or updating a cell status associated with the NTN. The determination component 708 may determine an update timer length for updating the one or more system information parameters associated with the NTN or the cell status associated with the NTN. The acquisition component 710 may acquire, from a current cell or a new cell, a SIB to refresh the one or more system information parameters after an expiration time associated with the one or more system information parameters, wherein the expiration time is based at least in part on the reference time and the update timer length.

The reception component 702 may receive signaling that indicates a value of the update timer length from a range of configured values for the update timer length.

The reception component 702 may receive signaling that indicates a value of the update timer length as an integer multiple of a duration associated with a system information modification period.

The reception component 702 may receive signaling that indicates a value of the update timer length as an integer multiple of a duration associated with a paging DRX cycle or a predefined time duration.

The reception component 702 may receive signaling that indicates a value of the update timer length as an integer multiple of a duration associated with a system information periodicity or a system information scheduling window.

The reception component 702 may receive signaling that indicates a value of the update timer length as an integer multiple of a number of system frames in a SFN wrap-around period.

The reception component 702 may receive signaling that indicates a value of the update timer length as a combination of an integer multiple of a time duration and an integer multiple of a number of system frames in an SFN wrap-around period.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a UE, comprising: determining a reference time for updating one or more system information parameters associated with an NTN or updating a cell status associated with the NTN; determining an update timer length for updating the one or more system information parameters associated with the NTN or the cell status associated with the NTN; and acquiring, from a current cell or a new cell, a SIB to refresh the one or more system information parameters after an expiration time associated with the one or more system information parameters, wherein the expiration time is based at least in part on the reference time and the update timer length.

Aspect 2: The method of Aspect 1, wherein the reference time is a boundary of a system information modification period.

Aspect 3: The method of Aspect 1, wherein the reference time is a boundary of a system information period within a system information modification periodicity.

Aspect 4: The method of Aspect 1, wherein the reference time is a system frame that has a configured SFN.

Aspect 5: The method of Aspect 1, wherein the reference time is a boundary of a system information scheduling window within a system information period.

Aspect 6: The method of any of Aspects 1-5, wherein determining the update timer length includes: receiving signaling that indicates a value of the update timer length from a range of configured values for the update timer length.

Aspect 7: The method of any of Aspects 1-5, wherein determining the update timer length includes: receiving signaling that indicates a value of the update timer length as an integer multiple of a duration associated with a system information modification period.

Aspect 8: The method of any of Aspects 1-5, wherein determining the update timer length includes: receiving signaling that indicates a value of the update timer length as an integer multiple of a duration associated with a paging DRX cycle or a predefined time duration.

Aspect 9: The method of any of Aspects 1-5, wherein determining the update timer length includes: receiving signaling that indicates a value of the update timer length as an integer multiple of a duration associated with a system information periodicity or a system information scheduling window.

Aspect 10: The method of Aspects 1-5, wherein determining the update timer length includes: receiving signaling that indicates a value of the update timer length as an integer multiple of a number of system frames in an SFN wrap-around period.

Aspect 11: The method of Aspects 1-5, wherein determining the update timer length includes: receiving signaling that indicates a value of the update timer length as a combination of an integer multiple of a time duration and an integer multiple of a number of system frames in an SFN wrap-around period.

Aspect 12: The method of any of Aspects 1-5, wherein the update timer length has a default value in an absence of signaling that indicates a value of the update timer length.

Aspect 13: The method of any of Aspects 1-12, wherein the update timer length is associated with updating the one or more system parameters or updating a time when a cell is to be switched off or added to the NTN.

Aspect 14: The method of any of Aspects 1-13, wherein the update timer length is specific to a PLMN, a TAC, or a cell that includes multiple PLMNs sharing a common TAC update timing.

Aspect 15: The method of any of Aspects 1-14, wherein the one or more system information parameters include one or more of a TAC or ephemeris data.

Aspect 16: An apparatus for wireless communication at a device, comprising a processor; memory coupled with the processor; and instructions stored in the memory and executable by the processor to cause the apparatus to perform the method of any of Aspects 1-15.

Aspect 17: A device for wireless communication, comprising a memory and one or more processors coupled to the memory, the one or more processors configured to perform the method of any of Aspects 1-15.

Aspect 18: An apparatus for wireless communication, comprising at least one means for performing the method of any of Aspects 1-15.

Aspect 19: A non-transitory computer-readable medium storing code for wireless communication, the code comprising instructions executable by a processor to perform the method of any of Aspects 1-15.

Aspect 20: A non-transitory computer-readable medium storing a set of instructions for wireless communication, the set of instructions comprising one or more instructions that, when executed by one or more processors of a device, cause the device to perform the method of any of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed at a user equipment (UE), comprising:
   determining a reference time for updating one or more system information parameters associated with a non-terrestrial network (NTN);
   determining an update timer length associate with updating the one or more system information parameters; and
   acquiring, from a current cell or a new cell, a system information block (SIB) to update the one or more system information parameters after an expiration time associated with the one or more system information parameters, wherein the expiration time is based at least in part on the reference time and the update timer length.

2. The method of claim 1, wherein the reference time is associated with a boundary of a system information modification period.

3. The method of claim 1, wherein the reference time is a boundary of a system information periodicity within a system information modification period.

4. The method of claim 1, wherein the reference time is a system frame that has a configured system frame number.

5. The method of claim 1, wherein the reference time is a boundary of a system information scheduling window within a system information period.

6. The method of claim 1, wherein determining the update timer length comprises:
   receiving signaling that indicates a value of the update timer length from a range of configured values for the update timer length,
      wherein the update timer length is based on the value of the update timer length.

7. The method of claim 1, wherein determining the update timer length comprises:
   receiving signaling that indicates a value of the update timer length as an integer multiple of a duration associated with a system information modification period,
      wherein the update timer length is based on the value of the update timer length.

8. The method of claim 1, wherein determining the update timer length comprises:
   receiving signaling that indicates a value of the update timer length as an integer multiple of a duration associated with a paging discontinuous reception cycle or a predefined time duration,
      wherein the update timer length is based on the value of the update timer length.

9. The method of claim 1, wherein determining the update timer length comprises:
   receiving signaling that indicates a value of the update timer length as an integer multiple of a duration associated with a system information periodicity or a system information scheduling window,
      wherein the update timer length is based on the value of the update timer length.

10. The method of claim 1, wherein determining the update timer length comprises:
    receiving signaling that indicates a value of the update timer length as an integer multiple of a number of system frames in a system frame number wrap-around period,
       wherein the update timer length is based on the value of the update timer length.

11. The method of claim 1, wherein determining the update timer length comprises:
    receiving signaling that indicates a value of the update timer length as a combination of an integer multiple of a time duration and an integer multiple of a number of system frames in a system frame number wrap-around period,
       wherein the update timer length is based on the value of the update timer length.

12. The method of claim 1, wherein the update timer length has a default value in an absence of signaling that indicates a value of the update timer length.

13. The method of claim 1, wherein the update timer length is associated with updating the one or more system parameters or updating a time when a cell is to be switched off or added to the NTN.

14. The method of claim 1, wherein the update timer length is specific to a public land mobile network (PLMN), a tracking area code (TAC), or a cell that includes multiple PLMNs sharing a common TAC update timing.

15. The method of claim 1, wherein the one or more system information parameters include one or more of a tracking area code or ephemeris data.

16. A user equipment (UE), comprising:
    a transceiver;
    a memory comprising instructions; and one or more processors configured to execute the instructions and cause the UE to
  determine a reference time for updating one or more system information parameters associated with a non-terrestrial network (NTN);
  determine an update timer length associated with updating the one or more system information parameters; and
  receive, via the transceiver and from a current cell or a new cell, a system information block (SIB) to update the one or more system information parameters after an expiration time associated with the one or more system information parameters, wherein the expiration time is based at least in part on the reference time and the update timer length.

17. An apparatus for wireless communication, comprising:
  a memory comprising instructions;
  one or more processors configured to execute the instructions and cause the apparatus to:
    determine a reference time for updating one or more system information parameters associated with a non-terrestrial network (NTN); and
    determine an update timer length associated with updating the one or more system information parameters; and
    acquire, from a current cell or a new cell, a system information block (SIB) to update the one or more system information parameters after an expiration time associated with the one or more system information parameters, wherein the expiration time is based at least in part on the reference time and the update timer length.

18. The apparatus of claim 17, wherein the reference time is a boundary of a system information modification period.

19. The apparatus of claim 17, wherein the reference time is a boundary of a system information periodicity within a system information modification period.

20. The apparatus of claim 17, wherein the reference time is a system frame that has a configured system frame number.

21. The apparatus of claim 17, wherein the reference time is a boundary of a system information scheduling window within a system information period.

22. The apparatus of claim 17, wherein the one or more processors are further configured to execute the instructions and cause apparatus to:
  receive signaling that indicates a value of the update timer length from a range of configured values for the update timer length,
  wherein the one or more processors, to determine the update timer length, are configured to execute the instructions and cause apparatus to:
    determine the update timer length based on the signaling, and wherein the update timer length is based on the value of the update timer length.

23. The apparatus of claim 17, wherein the one or more processors are further configured to execute the instructions and cause apparatus to:
  receive signaling that indicates a value of the update timer length as an integer multiple of a duration associated with a system information modification period,
  wherein the one or more processors, to determine the update timer length, are configured to execute the instructions and cause apparatus to:
    determine the update timer length based on the signaling, and
  wherein the update timer length is based on the value of the update timer length.

24. The apparatus of claim 17, wherein the one or more processors are further configured to execute the instructions and cause apparatus to:
  receive signaling that indicates a value of the update timer length as an integer multiple of a duration associated with a system information period or a system information scheduling window,
  wherein the one or more processors, to determine the update timer length, are configured to execute the instructions and cause apparatus to:
    determine the update timer length based on the signaling, and
  wherein the update timer length is based on the value of the update timer length.

25. The apparatus of claim 17, wherein the one or more processors are further configured to execute the instructions and cause apparatus to:
  receive signaling that indicates a value of the update timer length as an integer multiple of a number of system frames in a system frame number wrap-around period,
  wherein the one or more processors, to determine the update timer length, are configured to execute the instructions and cause apparatus to:
    determine the update timer length based on the signaling, and
  wherein the update timer length is based on the value of the update timer length.

26. The apparatus of claim 17, wherein the update timer length has a default value in an absence of signaling that indicates a value of the update timer length.

27. The apparatus of claim 17, wherein the update timer length is specific to a public land mobile network (PLMN), a tracking area code (TAC), or a cell that includes multiple PLMNs sharing a common TAC update timing.

28. The apparatus of claim 17, wherein the one or more system information parameters include one or more of a tracking area code or ephemeris data.

29. An apparatus for wireless communication, comprising:
  means for determining a reference time for updating one or more system information parameters associated with a non-terrestrial network (NTN);
  means for determining an update timer length associated with updating the one or more system information parameters; and
  means for acquiring, from a current cell or a new cell, a system information block (SIB) to update the one or more system information parameters after an expiration time associated with the one or more system information parameters, wherein the expiration time is based at least in part on the reference time and the update timer length.

30. The UE of claim 16, wherein the reference time is associated with a boundary of a system information modification period.

* * * * *